United States Patent [19]
Hata et al.

[11] Patent Number: 4,919,694
[45] Date of Patent: Apr. 24, 1990

[54] SELECTIVE GAS PERMEATION MEMBRANES AND METHOD OF MANUFACTURING THEM

[75] Inventors: Yasuo Hata; Kenkichi Takahashi, both of Sodegaura, Japan

[73] Assignee: Idemitsu Kosan Company Limited, Tokyo, Japan

[21] Appl. No.: 290,342

[22] Filed: Dec. 27, 1988

[30] Foreign Application Priority Data

Dec. 28, 1987 [JP] Japan .................... 62-332783
Apr. 11, 1988 [JP] Japan .................... 62-88481
Apr. 11, 1988 [JP] Japan .................... 62-88482

[51] Int. Cl.$^5$ .............................. B01D 53/22
[52] U.S. Cl. ............................ 55/158; 55/16
[58] Field of Search .................... 55/16, 68, 158

[56] References Cited

U.S. PATENT DOCUMENTS

| | | | |
|---|---|---|---|
| 3,509,694 | 5/1970 | Imai et al. .................... | 55/16 |
| 3,510,387 | 5/1970 | Robb .......................... | 55/16 X |
| 3,550,355 | 12/1970 | Remus et al. ................. | 55/16 |
| 3,657,113 | 4/1972 | Stancell et al. ............... | 55/16 X |
| 3,754,375 | 8/1973 | Bouchilloux et al. ........... | 55/16 |
| 4,214,020 | 7/1980 | Ward et al. ................... | 55/158 X |
| 4,230,463 | 10/1980 | Henis et al. .................. | 55/16 |
| 4,239,793 | 12/1980 | Matsuura et al. .............. | 55/16 X |
| 4,410,338 | 10/1983 | Yamamoto et al. ............. | 55/16 X |
| 4,599,157 | 7/1986 | Suzuki et al. ................. | 55/158 X |
| 4,606,740 | 8/1986 | Kulprathipanja .............. | 55/158 X |
| 4,806,189 | 2/1989 | Kraus et al. .................. | 55/158 X |

FOREIGN PATENT DOCUMENTS

| | | | |
|---|---|---|---|
| 0092417 | 10/1983 | European Pat. Off. ........ | 55/158 |
| 0174918 | 3/1986 | European Pat. Off. ........ | 55/158 |
| 0175668 | 3/1986 | European Pat. Off. ........ | 55/158 |
| 48-64199 | 9/1973 | Japan . | |
| 58-008510 | 1/1983 | Japan ........................ | 55/158 |
| 58-8510 | 1/1983 | Japan . | |
| 58-14926 | 1/1983 | Japan . | |
| 58-163403 | 9/1983 | Japan . | |
| 59-3201 | 1/1984 | Japan . | |
| 60-110303 | 6/1985 | Japan ........................ | 55/158 |
| 61-107921 | 5/1986 | Japan ........................ | 55/158 |
| 61-157325 | 7/1986 | Japan ........................ | 55/158 |
| 62-030522 | 2/1987 | Japan ........................ | 55/158 |
| 62-282619 | 12/1987 | Japan ........................ | 55/158 |
| 63-001421 | 1/1988 | Japan ........................ | 55/158 |
| 1039519 | 9/1983 | U.S.S.R. ..................... | 55/158 |

*Primary Examiner*—Robert Spitzer
*Attorney, Agent, or Firm*—Armstrong, Nikaido, Marmelstein, Kubovcik & Murray

[57] ABSTRACT

The present invention provides a selective gas permeation membrane in which the inner walls of pores in a porous substrated are coated with organosiloxane polymer and voids are formed in the central portion of the pores. The selective gas permeation membrane is produced by impregnating the porous substrate with the siloxane polymer followed by a crosslinking treatment to such an extent that the penetration degree of the crosslinked organosiloxane polymer reaches a range from 20 to 150 and then removing the crosslinked organosiloxane polymer undergoing insufficient crosslinking by means of a solvent.

6 Claims, 3 Drawing Sheets

SELECTIVE GAS PERMEATION MEMBRANES AND METHOD OF MANUFACTURING THEM

BACKGROUND OF THE INVENTION (1) Field of the Invention

The present invention concerns selective gas permeation membranes and a method of manufacturing them. More specifically, it relates to selective gas permeation membranes which are excellent, particularly, in the permeability and separatability of oxygen molecules, capable of obtaining oxygen-enriched gases or oxygen-reduced gases, such as nitrogen-enriched gases efficiently by removing oxygen from oxygen-containing gases such as air and capable of being used suitably as various gas separation membranes for use in combustion facilities, foodstuff industries, medical equipments and waste disposing facilities, as well as to a method of manufacturing such gas permeation membranes with practical advantage.

(2) Description of the Related Art

As the gas separation method, various methods have long been employed such as cooling-condensation-evaporation, adsorption separation, solvent extraction separation, etc.

By the way, these methods employed generally require a great amount of energy and complicated facilities. In view of the above, gas separation, by using membranes made of polymeric material, have been attempted generally intending to reduce the consumption of energy.

Gas separation methods using such polymeric membranes have been known, for example:

(1) Use of polyorganosiloxane of excellent selective gas permeability, particularly, selective permeability of oxygen molecules in the form of a copolymer or a blend with other polymeric material, for example, polycarbonate, polyurethane, polystyrene or polyphenylene oxide with an aim of improving the strength, etc. of the membranes (refer to Japanese Patent Laid-Open Nos. Sho 48-64199, 58-163,403, 58-14926, etc.), (2) Use of porous polymeric material for the membranes, and (3) Use of composite membranes prepared by applying a thin film to the surface of a porous support (for instance refer to Japanese Patent Publication No. Sho 59-3201).

However, the membranes in (1) and (3) above are not sufficient in the gas permeability, whereas the membranes in (2) above are insufficient for the selectivity.

Further, although a method of impregnating pores of a porous polymeric material with polyorganosiloxane has also been attempted, it involves a problem that only low gas permeability has been achieved by such means, failing to obtain sufficient practical performance.

On the other hand, there has also been proposed gas separating composite membranes in which thin films of silver, or like other metal are formed at the surface or on the inside of a polymeric membrane (Japanese Patent Application Laid-Open No. Sho 58-8510).

However, in a case where air is caused to permeate through the composite membrane, although the separation coefficient for $O_2/N_2$ is increased to 3.0 as compared with that of 1.0 in a case where no metal thin films are formed, the permeation coefficient is rather reduced to as low as $7.0 \times 10^{-9}$ cc-cm/cm$^2$.sec.cmHg as compared with that of $1.1 \times 10^{-7}$ cc-cm/cm$^2$.sec.cmHg in a case where no metal thin films are formed. Accordingly, this is not quite satisfactory in view of the permeation coefficient.

It has further been reported for the separation of oxygen-nitrogen the use of Nafion-silver composite membranes in which silver is deposited by way of sulfone groups on Nafion membranes having such groups (refer to "Journal of Membrane Science", vol. 31, -227 (1987)).

However, in the Nafion-silver composite membranes, although the $O_2/N_2$ separation coefficient is remarkably increased to 11.0, as compared with that of 2.0 in a case where silver is not deposited, the permeation coefficient is decreased, although little, to $1.0 \times 10^{-9}$ cc-cm/cm$^2$.sec.cmHg as compared with that of $1.5 \times 10^{-9}$ cc-cm/cm$^2$.sec.cmHg in a case where silver is not deposited and the value for the permeation coefficient is not quite satisfactory.

SUMMARY OF THE INVENTION

The present invention has been made in view of the foregoing situations.

Specifically, the object of the present invention is to provide selective gas permeation membranes which are highly gas permeable and excellent in the gas permeability and the separability, particularly, for the permeability and the separability of oxygen molecules. Another object of the present invention is to provide a method of producing such selective gas permeation membranes which is particularly advantageous from a practical point of view.

The present inventors have made earnest studies for overcoming the foregoing problems and, as a result, have found that selective gas permeation membranes excellent both in the gas permeability and separability can be obtained and the foregoing objects can be attained by impregnating a film-like porous substrate with a siloxane polymer followed by drying, or with a crosslinkable organosiloxane polymer followed by crosslinking treatment to a predetermined crosslinking degree and, thereafter, extracting to remove the organosiloxane polymer which has not undergone sufficient crosslinking by means of a solvent, and have accomplished the present invention based on such a finding.

That is, the present invention concerns a selective gas membrane, in which the inner walls of the pores in a porous substrate are coated with an organosiloxane polymer and voids are retain at the central portion of the pores.

The present invention also relates to a process for producing a selective gas permeation membrane which comprise impregnating a porous substrate with a siloxane polymer followed by drying, or with a crosslinkable organosiloxane polymer followed by partial crosslinking treatment.

DESCRIPTION OF THE PREFERRED EMBODIMENTS

Selective Gas Permeation Membrane (a) Porous substrate

As the porous substrate, there can be mentioned an organic porous substrate and an inorganic porous substrate.

As the organic porous substrate, there can be mentioned those polymeric porous substrates including homopolymers or copolymers of nitrocellulose, cellulose acetate, polysulfone, polyacrylonitrile, acrylic polymer such as polyacrylate, olefinic polymer such as polypropylene, polyvinyl chloride, polycarbonate, polyether sulfone, etc. or mixtures of them.

As the inorganic porous substrate, there can be mentioned those film-like porous substrates using ceramics such as barium titanate, potassium titanate, silica, alumina and glass, metals such as stainless steels and coppers, either alone or containing them as the main ingredient. In any of the cases of using the abovementioned porous substrates those prepared from fiberous materials into sheet-like materials by means of binder are suitable.

The average pore size of the porous substrate is within a range usually from 0.01 to 10 μm, preferably, from 0.1 to 5 μm.

If the average pore size is less than 0.01 μm, permeability (permeation coefficient) of gas such as an oxygen gas may sometimes be reduced. On the other hand, if it exceeds 10 μm, the permeability and the separability, particularly, for oxygen molecules may sometime be reduced.

There are no particular restrictions for the configuration of the porous substrate and any of the shapes, for example, flat film-like shape, hollow thread shape or tubular shape, may be used.

Furthermore, depending on the requirement, a gas permeable support such as a porous support, for example, porous ceramic support, porous organic polymeric support, porous metal support, etc. may be used for supporting the porous substrate.

(b) Silver

In the present invention, the inner wall of the pores in the porous substrate are coated with an organosiloxane polymer.

The inner walls of the porous substrate may be coated directly with the organosiloxane polymer. Further, silver also may be deposited on the inner walls of the pores at least near the surface of the porous substrate and the silver-deposited inner walls may be coated with the organosiloxane polymer, by which the separation performance for oxygen molecules can be improved.

In this case, it is technically difficult to deposit silver on the inner walls of the pores only near the surface of the porous substrate. In view of the above, it is practical to deposit silver in a film-like manner to the entire surface of the porous substrate and to the inner walls of the pores near the surface of the porous substrate.

For depositing the silver in a film-like manner, known methods, for example, vacuum deposition, ion plating, sputtering, etc. may be employed.

In the case of forming a thin silver film by the vacuum deposition, a porous substrate and metal silver are set, for example, to a bell jar type vapor deposition device and a tungsten boat containing metal silver is heated under a sufficient vacuum of about $10^{-6}$ torr, so that silver vapors are brought into contact with the surface of the porous substrate and silver is deposited there.

The thickness for the thin silver layer thus formed can be controlled optionally by varying the heating temperature and the vapor deposition time. The thickness of the thin silver layer is selected within a range usually from 50 to 5000 Å, preferably, from 100 to 1000 Å. In any of the cases, the thickness has to be controlled such that the fine pores of the porous substrate are not closed by the thin silver film. Accordingly, if the inner diameter of the pores of the porous substrate used is greater, the thickness of the film can also be made greater correspondingly.

Other than the method as described above, a method of depositing silver on the substrate by coating it with silver nitrate and then removing the nitrate, may also be used.

Furthermore, a method of coating or impregnating with a paste containing fine silver particles dispersed therein may also be used. Since the thickness of the thin silver film tends to be increased in this method, it is preferably applied to a porous substrate of a relatively large pore size.

(c) Organosiloxane polymer

The organosiloxane polymer can be classified into siloxane polymers and crosslinkable organosiloxane polymers.

As the siloxane polymer, there can be mentioned, for example, a silicone rubber represented by the formula (1):

where $R^1$ and $R^2$ represent respectively hydrogen atoms, alkyl groups with 1 to 4 carbon atoms, phenyl groups, vinyl groups, etc. and n is a number showing the degree of polymerization, or a copolymer having a compositional unit represents by the formula (2):

where $R^1$ and $R^2$ have the same meanings as described above, n and m represent respectively the polymerization degree and A represents a comonomer unit.

Further, as the crosslinkable organosiloxane polymer, there can be used those employed customarily as the material for the separation membranes of gases such as oxygen. As the crosslinkable organosiloxane polymer, there can be mentioned those polymer or prepolymer represented by the formula (3) or the formula (4):

where Y and Z represent respectively functional groups such as vinyl groups, amino groups, hydroxy groups and epoxy group, $R^1$, and $R^2$, A n and m have the same meanings as described above.

As the crosslinkable organosiloxane polymer, there can be mentioned, for example, polyorganosiloxane, siloxane -polycarbonate block copolymer, dimethylsiloxane - α- methylstyrene copolymer, α, ω-polysiloxane - phenyl resin copolymer, α, ω-diaminoethylpolydimethylsiloxane - polyhydroxystyrene copolymer, siloxane - polyurethane copolymer and siloxane - polyether copolymer.

The crosslinkable organosiloxane polymer is converted by means of crosslinking treatment into an organosiloxane polymer.

As the crosslinking treatment, there can be mentioned those methods employed customarily, for example, heat treatment, UV-ray irradiation or other method of adding a cross-linker.

The crosslinkable organosiloxane polymer described above can be obtained, as required, by properly conducting polycondensation in the presence of a crosslinker such as a bi-functional organic silane compound, for example, dimethyldichlorosilane or a trifunctional organic silane compound such as methyltrichlorosilane.

Along with the organopolysiloxane polymer used as the selective gas permeation membranes according to the present invention, it is possible to add additives such as a polymerization promotor, a molecular weight controller, an aging inhibitor, etc. or other polymer within such a range as not to impair the object of the present invention. The kind of the polyfunctional group and the ratio of the crosslinkable organosiloxane polymer, the kind and the amount of the crosslinker used optionally may properly be selected depending on the desired properties of the gas permeation membranes.

(d) Selective gas permeation membrane

Figure 1:
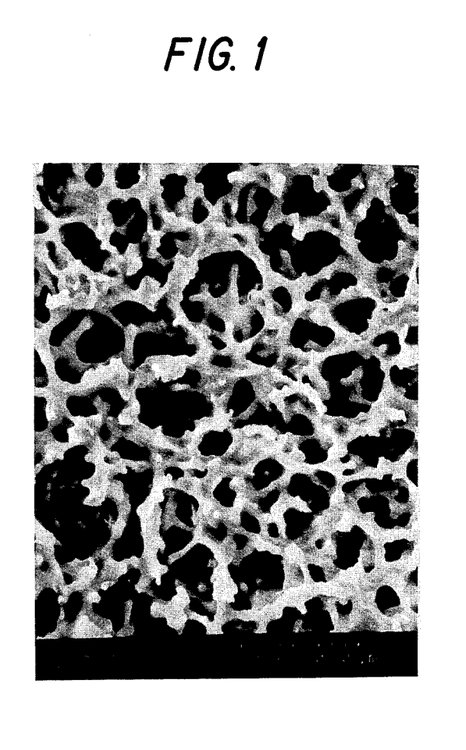
FIG. 1 is an electromicroscopic photograph at 3,000X, illustrating one example of a selective gas permeation membrane according to the present invention.
Figure 2:
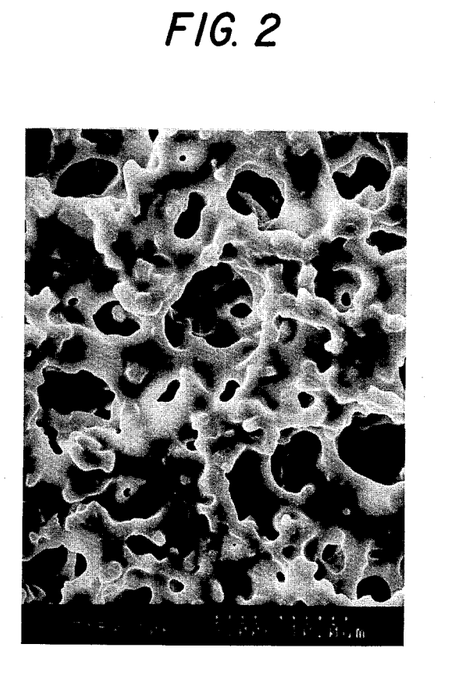
FIG. 2 is an electromicroscopic photograph, at 3,000X, illustrating one example at the rear face of the selective permeation membrane.

The selective gas permeation membrane according to the present invention has coating films of the organosiloxane polymer on the inner walls of the pores in the polymeric porous membrane and has voids at the central portion of the pores (refer for example to FIG. 1 and FIG. 2).

Further, the present invention also includes within the scope thereof those selective gas permeation membranes in which silver is deposited to the inner wall of the pores in the porous substrate at least near the surface of the porous substrate, and the surface of the porous substrate deposited with the silver is coated with the organosiloxane polymer.

Figure 3:
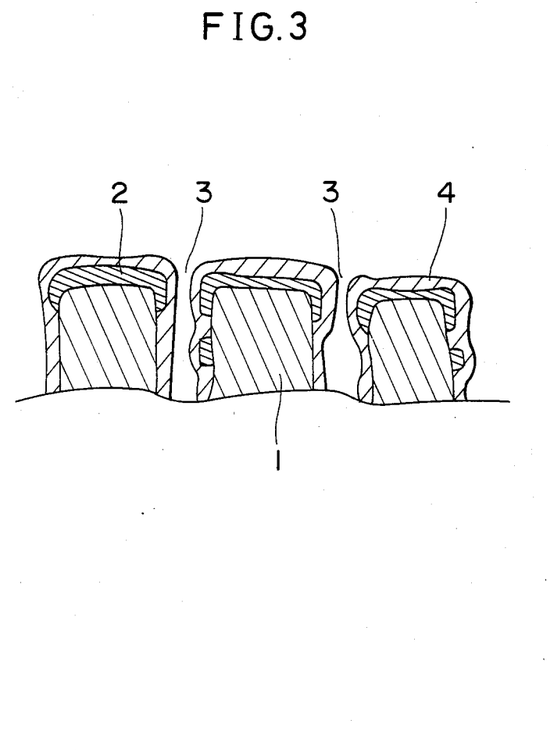
FIG. 3 is a cross sectional view illustrating a selective gas permeation membrane in which silver is deposited on the surface of pores.

The selective gas permeation membrane has a structure, for example, as shown in FIG. 3, in which a thin silver layer 2 is formed on the surface of the porous substrate 1, and a thin layer 4 of the organosiloxane polymer is formed on the thin layer 2 and on the inner walls of the pores 3.

The selective gas permeation membrane can be used alone, as a laminated structure in a stack of two or more of them depending on the purpose of use, or as a composite membrane supported on the support as described above.

Since the selective gas permeation membrane according to the present invention has a coating of the organosiloxane polymer of excellent permeation selectivity due to dissolution and diffusion of gases, particularly, oxygen molecules and has voids at the central portion of the pores, it can constitute a selective gas permeation membrane of excellent practical usefulness, which is excellent in the strength of membrane, etc., excellent in permeability and separability for gases, particularly, oxygen molecules. Accordingly, it can reduce the size of a separation device and extend the applicable range remarkably.

The selective gas permeation membrane according to the present invention can preferably be utilized for various fields of gas separation membranes such as for the production of oxygen-enriched gases, as well as various other fields such as combustion, foodstuff industry, biochemical industry, medical equipment, analyzing equipment, waste disposal, etc.

Production Method for Selective Gas Permeation Membrane

Explanation is to be made in details for the second invention concerning a production process for the selective gas permeation membrane according to the present invention having practical usefulness.

In the production process, the porous substrate may be used as it is, or silver may be deposited on the inner wall of the pores in the porous substrate near the surface of the porous substrate before use. As the porous substrate having silver deposited thereon, those porous substrates having silver deposited in a thin film-like manner at the surface of the porous substrate and on the inner walls of the pores near the surface of the porous substrate, are employed practically. The method of forming the thin silver film has been detailed in the item (b) for "Selective Gas Permeation Membrane" as described above.

The impregnating treatment can be conducted by the method of (1) impregnating a porous substrate with a siloxane polymer followed by drying, (2) impregnating a porous substrate with a crosslinkable siloxane polymer followed by partial crosslinking and (3) impregnating a crosslinkable siloxane polymer, conducting partial crosslinking treatment and, further, removing the crosslinked organosiloxane polymer undergoing insufficient crosslinking by means of a solvent.

In the case of using the method (1) above, impregnation can be conducted by those means employed generally, for example, dipping, spraying and various kind of coating methods.

The impregnation can be applied to the entire portion or a desired portion of a porous substrate used. Further, the impregnation may be applied from one side of the porous substrate (inside or outer side in a case where the porous substrate is in a hollow thread-like form), or applied from both sides by dipping the entire porous substrate.

Referring to the amount of the siloxane polymer used, although it can not be defined simply since it varies depending on the pore volume of the porous substrate used, the membrane thickness of the siloxane polymer formed on the porous substrate, etc., it is desirable to use a sufficient amount to impregnate the inside of the pores over the entire surface of the gas permeation cross section of the porous substrate. In the usual case, the siloxane polymer is desirably used by from 10 to 500 parts in proportion of weight, preferably, from 20 to 250 parts by weight based on 100 parts by weight of the porous substrate. The amount of the siloxane polymer used has to be determined so that the pores are not closed by the siloxane polymer.

It is also possible to form a crosslinked organosiloxane polymer corresponding to the desired film thickness on the porous substrate used, by properly selecting the amount of the siloxane polymer used for the method of impregnation.

After applying impregnation of the siloxane polymer in this way, drying is applied by usual means, a solvent is removed if it is used, and a thin film of the organosiloxane polymer is formed on a desired thickness to the inner walls of the pores in the porous substrate.

In the case of using the method (2) and (3) above, the porous substrate is impregnated with the crosslinkable organosiloxane polymer, as it is or after properly diluting it with a solvent if the crosslinkable organosiloxane polymer is liquid, or after dissolving it in a solution of an appropriate concentration by using a solvent if the crosslinkable organosiloxane polymer is solid.

The method and the amount of impregnation are the same as those in (1) above.

After impregnating as described above, a crosslinking treatment is applied to the crosslinkable organosiloxane polymer impregnated into the pores. For the crosslinking treatment, customary means can be used such as heat treatment, UV-irradiation or addition of a crosslinker. In this case, it is desirable that the degree of crosslinking is controlled within a specific range.

That is, the crosslinking treatment is desirably conducted such that the degree of the crosslinking for the crosslinkable organosiloxane polymer is such that the penetration degree is within a range from 20 to 150 and, preferably, within range from 50 to 80.

The penetration degree is based on that for the crosslinked organosiloxane polymer obtained by applying crosslinking treatment under the same conditions for the crosslinkable organosiloxane polymer, separately, without impregnation to the porous substrate, which corresponds to ¼ immiscible viscosity measured according to JIS-K2220 method.

If the crosslinking degree is less than 20, expressed by the penetration degree, the crosslinkable organosiloxane polymer undergoes only insufficient crosslinking in the porous substrate and can not effectively be extracted even by applying solvent extraction in an extraction step and, accordingly, the gas permeation performance of the resultant gas permeation membrane may sometimes not be sufficient. On the other hand, if the crosslinking is applied to such an extent as providing a penetration degree of greater than 150, films of the organosiloxane polymer may not sometime be formed sufficiently to result in a reduction of the gas selectivity, particularly, for oxygen molecules.

As the method used for the specific crosslinking treatment, there are no particular restrictions and heat treatment, for example, by warm or hot air can preferably be employed.

Although the conditions for the heat treatment can not generally be defined, depending on the kind of the crosslinkable organosiloxane polymer used, the addition ratio of crosslinker and like other conditions, there are generally applicable, those conditions such as applying the treatment at a temperature from 10° to 150° C., preferably, from 50° to 100° C., usually for 1 min to 2 hours, preferably, from 10 to 30 min.

in the case of using a solvent for the impregnation, the heat treatment may be applied after the removal of the solvent by the evaporation, etc. or heat treatment may be conducted in the presence of the solvent.

After applying the crosslinking treatment as described above, extraction treatment using a solvent is applied after extracting and removing the un-crosslinked crosslinkable organosiloxane polymer in the crosslinked product.

As a solvent usable for the extracting treatment, there can be used those which do not substantially dissolve the porous substrate used but are capable of dissolving the un-crosslinked crosslinkable organosiloxane polymer. Usually, a hydrocarbon solvent, etc. can be used preferably.

As specific examples of the hydrocarbon solvent, there can be mentioned aliphatic hydrocarbons such as hexane, heptane and octane, cycloaliphatic hydrocarbons such as cyclohexane and methylcyclohexane, aromatic hydrocarbons such as benzene, toluene and xylene and halogenated hydrocarbons such as carbon tetrachloride, dichloromethane, trichloroethane, tetrachloroethane, trichloroethylene and chlorobenzene. These extracting solvents may be used alone or as a mixture of two or more of them.

Among the various solvents described above, aromatic hydrocarbons are preferred and, particularly, benzene, toluene and xylene are preferred.

While customary means can be employed for the extracting treatment, a method of using a heated solvent, a method of recycling the solvent and like other heating methods can preferably be employed. Although the conditions employed for the solvent extraction can not generally be defined since they vary depending on the kind of the crosslinkable organosiloxane polymer employed, the kind and the amount of solvent used, the conditions are, for example, a temperature range usually from 20° to 150° C., preferably from 50° to 100° C. and a treating time usually from 1 min to 1 hour, preferably, from 10 min to 30 min.

After applying the extracting treatment, washing is applied optionally by means of the solvent. The solvent contained in the resultant selective gas permeation membranes is dried by usual drying method, for example, heat-drying, hot air drying and reduced pressure drying, thereby making it possible to obtain the desired selective gas permeation membrane.

As has been described above, it is possible to obtain a selective gas permeation membrane having crosslinked organosiloxane polymer in the pores of the porous substrate and having voids at the central portions of the pores easily and efficiently.

ADVANTAGE OF THE INVENTION

According to the first aspect of the invention of the present application, it is possible to provide a selective gas permeation membrane of practical usefulness, which is excellent in mechanical property, such as strength of membrane, and has remarkably improved gas permeability, such as for gaseous oxygen without reducing the permeation selectivity to gases, particularly, gaseous oxygen. Further, according to the second aspect of the invention of the present application, it is possible to provide a production process for the selective gas permeation membrane of remarkable practical usefulness having excellent performance as described above easily and efficiently by the impregnation treatment.

EXAMPLE

Example 1

After coating and impregnating a nitrocellulose membrane filter of 1.0 μm pore size with polysiloxane (KE1052, manufactured by Shinetsu Silicone Co.), cross-linking was applied in hot air at 70° C. for 2 hours. Separately, penetration degree was measured for the crosslinked polysiloxane prepared by applying cross-linking to the polysiloxane alone in hot air at 70° C. for 2 hours, according to JIS-K2220. As a result, the penetration degree was 65.

Then, the resultant filter impregnated with the cross-linked polysiloxane was immersed in toluene at 93° C. for 45 min to remove both un-crosslinked polysiloxane and the polysiloxane which has been insufficiently crosslinking by extraction. Then, the product was dried under a reduced pressure at 50° C. to obtain a gas permeable membrane.

For the resultant gas permeation membrane, the permeability was evaluated both for oxygen gas and nitrogen gas, respectively, by means of a pressure method (with differential pressure of 0.5 kg/cm$^2$). The results are shown in Table 1.

Examples 2-7

After coating and impregnating the same filter as in Example 1 with various polysiloxanes respectively, cross-linking was applied with hot air at 100° C. for 2 hours. Separately, polysiloxane was applied with cross-linking treatment and the penetration degree was as shown in Table 1.

The resultant filter impregnated with the crosslinked polysiloxane was subjected to the same solvent extraction and drying as in Example 1 and evaluated for its gas permeability. The results are shown in Table 1.

Example 8

The procedures were the same as those in Example 1 except for using a barium titanate porous membrane (manufactured by Honshu Seishi Co.) as the porous substrate.

The results are shown in Table 1.

Example 9

The procedures were the same as those in Example 1 except for using an alumina substrate as the porous substrate.

The results are shown in Table 1.

Example 10

The procedures were the same as those in Example 1 except for using a stainless steel filter of 3.0 μm pore size (manufactured by Nippon Seisen Co.) as the porous substrate.

The results are shown in Table 1.

Comparative Example 1

The procedures were the same as those in Example 1 except for not conducting the toluene extraction.

The results are shown in Table 1.

Comparative Example 2

After coating and impregnating the same nitrocellulos membrane filter as used in Example 1 with polysiloxane (X82-7308: manufactured by Shinethu Silicone Co.), cross-linking was applied by UV-irradiation for 3 min. In this case, the penetration degree of the cross-linked polysiloxane was less than 1. The product was applied with extraction treatment as and dried as in Example 1, and the permeability was evaluated.

The results are shown in Table 1.

Comparative Example 3

After coating and impregnating the same barium titanate porous membrane as used in Example 8 with polysiloxane (KE-103: manufactured by Shinetsu Silicone Co.), cross-linking was applied by heating at 100° C. for 2 hours. The penetration degree of the crosslinked polysiloxane under this condition was 4. The resultant selective gas permeation membrane was applied with the same solvent extraction and drying as in Example 1 and then the gas permeability was evaluated.

The results are shown in Table 1.

TABLE 1

| | Penetration degree | Oxygen gas permeability [PO$_2$] cc-cm/ cm$^2$ · sec · cmHg) | Nitrogen gas permeability [PN$_2$] cc-cm/ cm$^2$ · sec · cmHg) | PO$_2$/PN$_2$ |
|---|---|---|---|---|
| Example 1 | 65 | 3.28 × 10$^{-5}$ | 2.07 × 10$^{-5}$ | 1.59 |
| Example 2 | 35 | 0.16 × 10$^{-5}$ | 0.09 × 10$^{-5}$ | 1.78 |
| Example 3 | 53 | 0.24 × 10$^{-5}$ | 0.12 × 10$^{-5}$ | 2.00 |
| Example 4 | 58 | 1.17 × 10$^{-5}$ | 0.58 × 10$^{-5}$ | 2.02 |
| Example 5 | 63 | 1.95 × 10$^{-5}$ | 0.97 × 10$^{-5}$ | 2.01 |
| Example 6 | 75 | 1.97 × 10$^{-5}$ | 1.03 × 10$^{-5}$ | 1.91 |
| Example 7 | 86 | 5.25 × 10$^{-5}$ | 2.69 × 10$^{-5}$ | 1.95 |
| Example 8 | 65 | 0.13 × 10$^{-5}$ | 0.11 × 10$^{-5}$ | 1.18 |
| Example 9 | 65 | 0.07 × 10$^{-5}$ | 0.05 × 10$^{-5}$ | 1.40 |
| Example 10 | 65 | 0.14 × 10$^{-5}$ | 0.07 × 10$^{-5}$ | 2.00 |
| Comparative Example 1 | 65 | 4.46 × 10$^{-8}$ | 2.33 × 10$^{-8}$ | 1.91 |
| Comparative Example 2 | 1 | 3.14 × 10$^{-8}$ | 1.39 × 10$^{-8}$ | 2.26 |
| Comparative Example 3 | 4 | 3.20 × 10$^{-8}$ | 1.50 × 10$^{-8}$ | 2.13 |

Evaluation

From the results in Table 1, it can be seen that the selective gas permeation membranes prepared by impregnating the porous substrates with the crosslinkable organosiloxane polymer, applying crosslinking treatment to such an extent that the degree of the crosslinking reaches a range of the penetration degree for the crosslinked organopolysiloxane polymer of from 20 to 150, and removing the organosiloxane polymer which has been insufficiently crosslinked by using a solvent (Examples 1-10), have better gas permeability than those selective gas permeation membranes produced in other methods (Comparative Examples 1-3).

Examples 11-14

The procedures were the same as those in Example 1 except for using a nitrocellulose membrane filter having pore sizes of the values shown in Table 2.

The results are shown in Table 2.

Example 15

The procedures were the same as those in Example 1 except for using an acetyl cellulose membrane filter (0.8 μm pore size) as the filter.

The results are shown in Table 2.

Example 16

The procedures were the same as those in Example 1 except for using a regenerated cellulose membrane filter (0.65 μm pore size) as the porous substrate.

The results are shown in Table 2.

Example 17

The procedures were the same as those in Example 1 except for using a polyvinyl chloride porous membrane (0.45 μm pore size) as the porous substrate.

The results are shown in Table 2.

Example 18

The procedures were the same as those in Example 1 except for using a polyacrylate porous membrane (1.2 μm pore size) as the porous substrate.

The results are shown in Table 2.

Example 19

The procedures were the same as those in Example 1 except for using a polypropylene porous membrane (0.65 μm pore size) as the porous substrate.

The results are shown in Table 2.

Example 20

The procedures were the same as those in Example 1 except for using hexane as the extraction solvent at an extraction temperature of 69° C.

The results are shown in Table 2.

Example 21

The procedures were the same as those in Example 1 except for using carbon tetrachloride as the extraction solvent at an extraction temperature of 76° C.

The results are shown in Table 2.

Example 22

The procedures were the same as those in Example 1 except for using a polyether sulfone porous membrane (0.8 μm pore size) as the porous substrate using hexane as the extraction solvent and applying extraction at 69° C.

The results are shown in Table 2.

Example 23

The procedures were the same as those in Example 1 except for using a modified polysulfone porous membrane (0.4 μm pore size) as the porous substrate using hexane as the extraction solvent and applying extraction at 69° C.

The results are shown in Table 2.

Example 24

The procedures were the same as those in Example 1 except for using a polysiloxane having a methylphenyl-siloxane skelton for the molecular structure.

The results are shown in Table 2.

TABLE 2

| | Pore size (μm) | Oxygen gas permeability [PO$_2$] (cc-cm/ cm$^2$·sec·cmHg) | Nitrogen gas [PN$_2$] (cc-cm/ cm$^2$·sec·cmHg) | permeability PO$_2$/PN$_2$ |
|---|---|---|---|---|
| Example 11 | 0.10 | 0.99 × 10$^{-5}$ | 0.66 × 10$^{-5}$ | 1.50 |
| Example 12 | 0.65 | 4.20 × 10$^{-5}$ | 2.21 × 10$^{-5}$ | 1.90 |
| Example 13 | 3.0 | 2.35 × 10$^{-5}$ | 1.18 × 10$^{-5}$ | 1.99 |
| Example 14 | 5.0 | 5.71 × 10$^{-5}$ | 2.88 × 10$^{-5}$ | 1.98 |
| Example 15 | 0.8 | 0.50 × 10$^{-5}$ | 0.24 × 10$^{-5}$ | 2.08 |
| Example 16 | 0.65 | 0.10 × 10$^{-5}$ | 0.06 × 10$^{-5}$ | 1.67 |
| Example 17 | 0.45 | 2.83 × 10$^{-5}$ | 1.64 × 10$^{-5}$ | 1.72 |
| Example 18 | 1.2 | 5.40 × 10$^{-5}$ | 2.60 × 10$^{-5}$ | 2.08 |
| Example 19 | 0.65 | 2.45 × 10$^{-5}$ | 1.83 × 10$^{-5}$ | 1.34 |
| Example 20 | 1.0 | 0.54 × 10$^{-5}$ | 0.26 × 10$^{-5}$ | 2.08 |
| Example 21 | 1.0 | 0.72 × 10$^{-5}$ | 0.34 × 10$^{-5}$ | 2.12 |
| Example 22 | 0.8 | 1.08 × 10$^{-5}$ | 0.50 × 10$^{-5}$ | 2.16 |
| Example 23 | 0.4 | 0.59 × 10$^{-5}$ | 0.29 × 10$^{-5}$ | 2.03 |
| Example 24 | 1.0 | 2.35 × 10$^{-5}$ | 1.45 × 10$^{-5}$ | 1.62 |

Next, the permeation and the separation coefficient (N$_2$/O$_2$) for oxygen gas and nitrogen gas were measured for a selective gas permeation membrane according to the present invention in which silver was not deposited near to the surface of the porous substrate.

Example 25

After vapor depositing silver to a nitrocellulose porous membrane of 1.0 μm pore size onto form a thin silver layer of 300 Å thickness, it was impregnated with a liquid composition comprising a mixture of a liquid organic siloxane compound A (containing —SiH bond in the molecule) and a liquid organic silicon compound B (containing —CH=CH$_2$ bond in the molecule) in 1:1 molar ratio for functional groups and applied with crosslinking under heating at 70° C. for 2 hours.

Then, the membrane was immersed in toluene and, after extracting the un-crosslinked product by heating at 90° C. for 30 min, dried to obtain a gas permeable membrane. The membrane was used for the same permeation test as in Example 1 to obtain the following results:

$P = 1.3 \times 10^{-6}$ cc.cm/cm$^2$.sec.cmHg $\alpha = 2.9$

Example 26

After vapor depositing silver on an acrylic porous membrane of 0.8 μm pore size to form a thin silver layer of 250 Å thickness, it was impregnated with a liquid composition comprising a mixture of liquid organic siloxane compound A and liquid organic silicon compound B in 1:1 molar ratio for functional groups and applied with crosslinking under heating at 70° C. for 2 hours.

Then, the membrane was immersed toluene and, after extracting the un-crosslinked product under heating at 90° C. for 30 min, dried to obtain a gas permeable membrane. The membrane was used for the same permeation test as in Example 1 to obtain the following results:

$P = 2.3 \times 10^{-6}$ cc.cm/cm$^2$.sec.cmHg $\alpha = 2.8$

Comparative Example 4

The procedures were the same as those in Example 26 except for not forming the thin silver layer in Example 26.

The results are:

$P = 4.3 \times 10^{-6}$ cc.cm/cm$^2$.sec.cmHg $\alpha = 1.9$

Example 27

A paste containing fine silver particles dispersed in toluene was coated, to a film thickness of 0.1 μm on a nitrocellulose porous membrane of 3.0 μm pore size, and dried. Then, after impregnating the coated membrane with a liquid mixture of liquid organic silicon compound A and liquid organic silicon compound B in 1:1 molar ratio for functional groups, crosslinking was applied under heating at 70° C. for 2 hours.

Then, the membrane was immersed in toluene the un-crosslinked product extracted under heating at 90° C. for 30 min and then dried to obtain a gas separation membrane. The membrane was used for the same permeation test as in Example 1 to obtain the following results:

$P = 1.0 \times 10^{-6}$ cc.cm/cm$^2$.sec.cmHg $\alpha = 2.5$

Example 28

A paste containing fine silver particles dispersed in toluene was coated, to a film thickness of 0.1 μm, on a nitrocellulose porous membrane of 5.0 μm pore size and dried. Then, after impregnating the coated membrane with a liquid mixture of liquid organic silicon compound A and liquid organic silicon compound B in 1:1 molar ratio for functional groups, crosslinking was applied under heating at 70° C. for 2 hours.

Then, the membrane was immersed in toluene, extracted to remove un-crosslinked product under heating at 90° C. for 30 min, and then dried to obtain a gas separation membrane. The membrane was used for the same permeation test as in Example 1 to obtain the following results:

$P = 3.4 \times 10^{-6}$ cc.cm/cm$^2$.sec.cmHg $\alpha = 2.7$

Evaluation

As apparent from the results of Examples 25–28 and Comparative Example 4, it can be seen that selective gas permeation membranes prepared by coating organosiloxane polymers onto silver-deposited porous substrates, applying crosslinking and then removing those organosiloxane polymers which were insufficiently crosslinked by means of solvent treatment, thereby forming voids in the central portions of the pores in the porous substrates, are better in the selectivity to oxygen molecules than those not deposited with silver.

What is claimed is:

1. A selective gas permeation membrane, comprising a porous substrate the inner walls of the pores of which are coated with a crosslinked organosiloxane polymer having a penetration degree of about 20 to 150 and containing voids in the central portion of at least a substantial number of said pores.

2. A selective gas permeation membrane as defined in claim 1, wherein the inner diameter of the pore in the porous substrate is from 0.01 to 10 μm.

3. A selective gas permeable membrane, comprising a porous substrate having pores, at least near the surface thereof, the inner walls of which have silver deposited thereon and further containing a crosslinked organosiloxane polymer coated on said silver; said pores containing centrally disposed voids in at least a substantial portion thereof.

4. A method of producing a selective gas permeation membrane, which comprises steps of impregnating a porous substrate with a siloxane polymer followed by drying or with a crosslinkable organosiloxane polymer followed by crosslinking treatment to such an extent that the penetration degree of the crosslinked organosiloxane polymer reaches a range from 20 to 150 and, thereafter, removing the crosslinked organosiloxane polymer undergoing insufficient crosslinking by means of a solvent.

5. A method of producing a selective gas permeation membrane as defined in claim 4, wherein the solvent is a hydrocarbon solvent.

6. A method of producing selective gas permeation membrane as defined in claim 4, wherein silver is deposited to the inner wall of the pores in the porous substrate at least near the surface of said porous substrate.

* * * * *

UNITED STATES PATENT AND TRADEMARK OFFICE
CERTIFICATE OF CORRECTION

PATENT NO. : 4,919,694
DATED : April 24, 1990
INVENTOR(S) : HATA et al

It is certified that error appears in the above-identified patent and that said Letters Patent is hereby corrected as shown below:

On the cover page, Item [30], line 3, "62-88481" should read --63-88481--;

line 4, "62-88482" should read --63-88482--.

Signed and Sealed this

Twenty-fourth Day of December, 1991

Attest:

HARRY F. MANBECK, JR.

*Attesting Officer*  *Commissioner of Patents and Trademarks*